United States Patent
Hagimoto et al.

(10) Patent No.: US 11,091,647 B2
(45) Date of Patent: Aug. 17, 2021

(54) FILLER FOR RESINOUS COMPOSITION, FILLER-CONTAINING SLURRY COMPOSITION AND FILLER-CONTAINING RESINOUS COMPOSITION AS WELL AS PRODUCTION PROCESS FOR FILLER FOR RESINOUS COMPOSITION

(71) Applicant: ADMATECHS CO., LTD., Miyoshi (JP)

(72) Inventors: Shinta Hagimoto, Miyoshi (JP); Nobutaka Tomita, Miyoshi (JP); Masaru Kuraki, Misyoshi (JP)

(73) Assignee: ADMATECHS., LTD., Miyoshi (JP)

( * ) Notice: Subject to any disclaimer, the term of this patent is extended or adjusted under 35 U.S.C. 154(b) by 0 days.

(21) Appl. No.: 17/060,138

(22) Filed: Oct. 1, 2020

(65) Prior Publication Data

US 2021/0017392 A1    Jan. 21, 2021

Related U.S. Application Data

(63) Continuation of application No. PCT/JP2019/015326, filed on Apr. 8, 2019.

(30) Foreign Application Priority Data

Apr. 6, 2018    (WO) .................. PCT/JP2018/014818

(51) Int. Cl.
  *C09C 1/40* (2006.01)
  *C01B 39/20* (2006.01)
  (Continued)

(52) U.S. Cl.
  CPC .............. *C09C 1/405* (2013.01); *C01B 39/20* (2013.01); *C01B 39/36* (2013.01); *C09D 11/037* (2013.01);
  (Continued)

(58) Field of Classification Search
  CPC ..... C01B 39/20; C01B 39/36; C01P 2004/84; C01P 2006/32; C09C 1/405; C09D 11/037
  See application file for complete search history.

(56) References Cited

U.S. PATENT DOCUMENTS

| 2,885,366 A | 5/1959 | Iler |
| 9,687,827 B2 | 6/2017 | Otaka et al. |
| (Continued) | | |

FOREIGN PATENT DOCUMENTS

| CN | 110520468 A | 11/2019 |
| JP | S59-133265 A | 7/1984 |
| (Continued) | | |

OTHER PUBLICATIONS

Combined Chinese Office Action and Search Report dated Oct. 12, 2020, in Chinese Patent Application No. 201980002158.3 (with English translation), 33 pages.
(Continued)

*Primary Examiner* — Shuangyi Abu Ali
(74) *Attorney, Agent, or Firm* — Oblon, McClelland, Maier & Neustadt, L.L.P.

(57) ABSTRACT

A filler for resinous composition is contained and used in resinous composition constituting electronic packaging material for electronic device, and includes: a filler ingredient including a crystalline siliceous material with a crystal structure made of at least one member selected from the group consisting of type FAU, type FER, type LTA, type MFI and type CHA, and/or type MWW, wherein: the filler ingredient is free of any activity when evaluated by an "NH3-TPD" method; and includes the crystalline siliceous material in an amount falling in a range allowing the filler ingredient to exhibit a negative thermal expansion coefficient. The filler ingredient may further be free of a surface
(Continued)

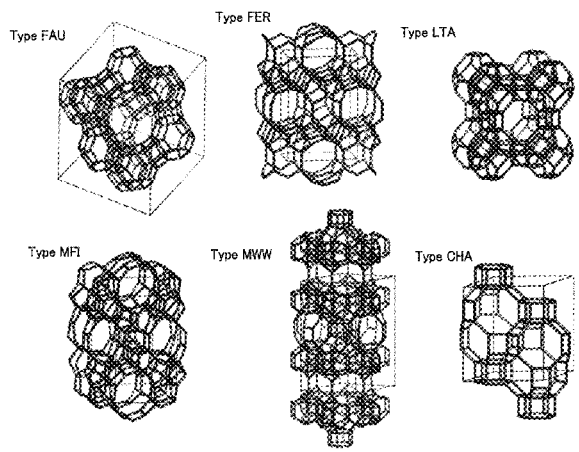

Source : The Database of International Zeolite Association in which silver, copper, zinc, mercury, tin, lead, bismuth, cadmium, chromium, cobalt and nickel are exposed.

15 Claims, 8 Drawing Sheets

(51) Int. Cl.
    *C01B 39/36*     (2006.01)
    *C09D 11/037*     (2014.01)

(52) U.S. Cl.
    CPC ...... *C01P 2004/84* (2013.01); *C01P 2006/32* (2013.01)

(56) References Cited

U.S. PATENT DOCUMENTS

| | | | |
|---|---|---|---|
| 10,401,542 | B2 | 9/2019 | Yonezawa et al. |
| 2003/0187117 | A1 | 10/2003 | Starkovich |
| 2006/0160939 | A1 | 7/2006 | Starkovich |
| 2010/0096173 | A1 | 4/2010 | Fujino et al. |
| 2013/0131232 | A1* | 5/2013 | Sooknoi ............ C08J 5/18 524/81 |
| 2015/0027763 | A1 | 1/2015 | Hong et al. |
| 2015/0321151 | A1* | 11/2015 | Lee ............ B01D 71/56 210/500.38 |
| 2015/0328626 | A1* | 11/2015 | Otaka ............ B01J 29/40 585/475 |
| 2017/0307792 | A1 | 10/2017 | Yonezawa et al. |
| 2020/0040162 | A1 | 2/2020 | Hagimoto et al. |

FOREIGN PATENT DOCUMENTS

| | | | |
|---|---|---|---|
| JP | H3-050113 | A | 3/1991 |
| JP | 2000-026108 | A | 1/2000 |
| JP | 2003-292806 | A | 10/2003 |
| JP | 2011-002478 | A | 1/2011 |
| JP | 4766852 | B2 | 6/2011 |
| JP | 5192259 | B2 | 2/2013 |
| JP | 2015-024945 | A | 2/2015 |
| JP | 2015-214440 | A | 12/2015 |
| JP | 2016-044091 | A | 4/2016 |
| JP | 2016-118679 | A | 6/2016 |
| JP | 2017-119621 | A | 7/2017 |
| WO | WO 2013/147261 | A1 | 10/2013 |
| WO | WO 2018/189919 | A1 | 10/2018 |

OTHER PUBLICATIONS

Qian Yitai, "Introduction to Crystal Chemistry" University of Science and Technology of China Press, 3rd Edition, Aug. 31, 2005, pp. 293-294 (with English translation).

Luan Enjie, et al., "National Defense Science and Technology Glossary. Comprehensive", Aviation Industry Press, Jan. 2002, p. 302 (with English translation).

Hu Feiyan, et al., "Coating Basic Formula and Technology" Donghua University Press, Jun. 2013, pp. 31-32 (with English translation).

Thomas Carey, et al., "Chemical Control of Thermal Expansion in Cation-Exchanged Zeolite A" Chemistry Materials, 2014, vol. 26, No. 4, pp. 1561-1566 (with English translation).

P. Tschaufeser, et al., "Thermal Expansion Behavior of Zeolites and $AlPO_4s$", J. Phys. Chem., 1995, vol. 99, No. 26, pp. 10609-10615 (with English translation).

International Search Report dated Jun. 11, 2019, in PCT/JP2019/015326, filed Apr. 8, 2019 (with English Translation).

Written Opinion of International Search Report dated Jun. 11, 2019 in PCT/JP2019/015326 (with English Translation).

Notification of Reasons for Refusal dated Jun. 4, 2019, in Japanese Patent Application No. 2019-519439 (w/Computer-generated English translation).

Decision to Grant dated Jul. 9, 2019, in Japanese Patent Application No. 2019-519439 (w/Computer-generated English translation).

Chinese First Office Action dated Apr. 3, 2020, in Chinese Patent Application No. 201980002158.3 (w/Computer-generated English translation).

M. Ookawa et al. "Molecular Dynamics Simulation Studies on Thermal Expansion Behavior of Siliceous Faujasite", Journal of Computer Chemistry Japan, 2015, vol. 14. No. 4 p. 105-110.

* cited by examiner

FILLER FOR RESINOUS COMPOSITION, FILLER-CONTAINING SLURRY COMPOSITION AND FILLER-CONTAINING RESINOUS COMPOSITION AS WELL AS PRODUCTION PROCESS FOR FILLER FOR RESINOUS COMPOSITION

CROSS REFERENCE TO RELATED APPLICATIONS

The present application is a Continuation Application of International Application No. PCT/JP2019/015326, filed on Apr. 8, 2019, which is incorporated herein by reference. The present invention is based on International Application No. PCT/JP2018/014818, filed on Apr. 6, 2018, the entire contents of which are incorporated herein by reference.

BACKGROUND OF THE INVENTION

1. Field of the Invention

The present invention relates to a filler for resinous composition, the filler contained and used in resinous composition; a filler-containing slurry composition containing the filler for resinous composition; and a filler-containing resinous composition containing the filler for resinous composition; as well as a production process for filler for resinous composition.

2. Description of the Related Art

Conventionally, resinous compositions used for electronic packaging material, such as printed-circuit boards, epoxy molding compounds and liquid encapsulants, have been mixed with inorganic particles serving as fillers, for the purpose of adjusting their thermal expansion coefficient, and the like. Amorphous silica particles have been widely used mainly as the fillers because they exhibit a low thermal expansion coefficient, and have good insulating properties.

In recent years, accompanied by the requirements of providing electronic devices with high functionalities, developments have been underway in further thinning and highly densifying semiconductor packages, so the thermal expansions and warpages of semiconductor packages have come to affect the reliability of electronic devices more greatly. Hence, Japanese Patent Gazette No. 5192259 discloses an investigation that was carried out to lower the thermal expansion coefficients of cured substances, which make resinous compositions used for printed-circuit board, epoxy molding compounds and liquid encapsulants, so as to reduce the thermal expansions and warpages.

The present invention has been made in view of the aforementioned circumstances. It is therefore an object of the present invention to provide a filler for resinous composition, the filler enabling resinous compositions containing the filler to exhibit a lowered thermal expansion coefficient.

SUMMARY OF THE INVENTION

In order to achieve the aforementioned object, the present inventors studied an application of materials, whose thermal expansion coefficient is lower than that of amorphous silica and which exhibit a negative thermal expansion coefficient and contract upon being subjected to heat, to filler materials. Japanese Unexamined Patent Publication (KOKAI) Gazette No. 2015-214440 and Japanese Patent Gazette No. 4766852 disclose materials with a negative thermal expansion coefficient that involve particles composed of β-eucryptite (LiAlSiO$_4$) or zirconium tungstate (ZrW$_2$O$_8$). However, the β-eucryptite poses a problem of insufficient electric properties, because it contains Li as a major constituent element and diffusing Li ions lower its insulation properties. Moreover, Japanese Unexamined Patent Publication (KOKAI) Gazette No. 2000-26108 discloses a production process for heat-resistant inorganic oxide comprising steps of: bringing a silane coupling agent into contact with an inorganic oxide; and calcining the silane coupling agent and inorganic oxide by heating them at a thermal decomposition temperature of the silane coupling agent or more.

As conventional art solving the problem of diffusing Li ions, Japanese Unexamined Patent Publication (KOKAI) Gazette No. 2015-24945 discloses an inorganic filler comprising a shell including silica formed of tetraethyl orthosilicate (or TEOS) by a sol-gel method. That is, Japanese Unexamined Patent Publication (KOKAI) Gazette No. 2015-24945 relates to a technique which features covering a surface of the filler with the shell in order to inhibitions from eluting out of the filler, but does not relates to a technique applicable to a filler from which no ions elute. Moreover, Japanese Unexamined Patent Publication (KOKAI) Gazette No. 2016-118679 discloses a core/shell particle comprising a core made of ITO particles, and a shell covering the core and made of an insulation material.

The zirconium tungstate has been studied variously; however, it requires longer time and huge costs for the synthesis. Many reports are made on the zirconium tungstate produced at experimental laboratory level, but no method has been established yet for producing it industrially.

Next, among siliceous materials, crystalline siliceous materials have a crystal structure made of at least one member selected from the group consisting of type FAU, type FER, type LTA, type MFI and type CHA, and/or type MWW, and exhibit a negative thermal expansion coefficient. Of such crystalline silica materials, it has been proposed to let a resinous material contain faujasite and provide a composite material (see claim 6 in Japanese Unexamined Patent Publication (KOKAI) Gazette No. 2003-292806). Note that well-known faujasite includes Na and poses the problem of sodium elution as it is. However, the required level on the elution of ions is low when Japanese Unexamined Patent Publication (KOKAI) Gazette No. 2003-292806 was published, and the elution of ions did not cause any problem. Moreover, Japanese Unexamined Patent Publication (KOKAI) Gazette No. 59-133265 discloses that various zeolites involving type "X" and type "Y" zeolites, which correspond to type FAU, have a shortcoming of the elution of ions, and that a covering treatment inhibiting the elusion upgrades the characteristics of resin. In addition, Journal of Computer Chemistry, Japan, 2015, Vol. 14, pp. 105-110 discloses another zeolite with type FAU crystal structure, zeolite which exhibits a negative thermal expansion coefficient and is usable for fillers.

In recent years, investigating crystalline siliceous materials including faujasite for reducing the content of alkali metals in order to inhibit the elution amount of ions has revealed that it is possible to reduce the content of alkali metals while fully keeping the practicality like mechanical properties and electric properties.

Therefore, it is a technical common sense to recognize crystalline siliceous materials as materials capable of being mixed and used in resinous materials as they are.

Under such circumstances, the present inventors carried out wholehearted investigations for crystalline siliceous materials. As a result, it has been revealed that dispersing crystalline siliceous materials in resinous materials has promoted or accelerated yellowing or hardening of the resinous materials. Since the occurrence of such yellowing or hardening has not pose any problem immediately after dispersing crystalline siliceous materials in resinous materials but has made a problem in certain extent slightly later than the dispersion, the occurrence has not been noticed or has not been regarded as any problem. However, the occurrence posed a problem during the investigations by the present inventors who aimed at producing a resinous composition provided with high performance.

As a result of investigating the accelerated yellowing, or the like, the present inventors understood that hydroxyl groups, which are derived from aluminum element that the crystalline siliceous materials include, turn into active sites that affect resinous materials. An evaluation of the active sites for activity by an "NH3-TPD" method revealed that yellowing occurs when they exhibit activity. Moreover, crystalline siliceous materials were also able to keep the thermal expansion coefficient falling in a negative range even until the active sites lost the activity to the extent of being unobservable by the "NH3-TPD" method so that resinous materials were inhibited from yellowing.

Note herein that the crystalline siliceous materials include alkali metals in a content of 0.1% by mass or less, and include each of Li, Na and K in an amount of five ppm or less, the Li, Na and K extracted in water after immersing the crystalline siliceous materials in water whose temperature and pressure are conditioned at 120° C. under two atm for 24 hours. The content of alkali metals, and the extracted amount of Li, Na and K are thus set in order to inhibit eluting ions from adversely affecting final products.

The "NH3-TPD" method defined in the present description judges that a measurement object exhibits activity when the measurement object generates a desorption gas after it is subjected to an adsorption of ammonia ($NH_3$) serving as a probe molecule, and is then subjected to a continuous temperature increment. Specific measurement conditions are as follows: weighing out a measurement sample in an amount of about 50 mg; carrying out a degassing treatment at 500° C. for an hour in a helium (He) atmosphere; and letting the measurement object adsorb a 0.5%-by-volume ammonia gas with one atm in pressure at 100° C. for an hour. Thereafter, the "NH3-TPD" method judges that the measurement object exhibits activity when the temperature of the measurement object is increased up to 600° C. at a rate of 10° C./min; an observable peak temperature appears in a chart of ammonia desorption amount against temperature; and an ammonia desorption gas is generated in an amount of two jimol/g or more until the temperature is raised to 500° C.

The present invention has been completed based on the aforementioned knowledge. That is, a first filler for resinous composition according to the present invention achieving the aforementioned object is one which is contained and used in resinous composition constituting packaging material for electronic device, and comprises:

a filler ingredient including a crystalline siliceous material with a crystal structure made of at least one member selected from the group consisting of type FAU, type FER, type LTA, type MFI and type CHA, and/or type MWW, wherein:

the filler ingredient is free of any activity when evaluated by an "NH3-TPD" method; and the filler ingredient includes the crystalline siliceous material in an amount falling in a range allowing the filler ingredient to exhibit a negative thermal expansion coefficient.

A second filler for resinous composition according to the present invention achieving the aforementioned object is one which is contained and used in resinous composition, and comprises:

a filler ingredient including a crystalline siliceous material with a crystal structure made of at least one member selected from the group consisting of type FAU, type FER, type LTA, type MFI and type CHA, and/or type MWW, wherein:

the filler ingredient is free of a surface in which silver, copper, zinc, mercury, tin, lead, bismuth, cadmium, chromium, cobalt and nickel are exposed;

the filler ingredient is free of any activity when evaluated by an "NH3-TPD" method; and the filler ingredient includes the crystalline siliceous material in an amount falling in a range allowing the filler ingredient to exhibit a negative thermal expansion coefficient.

The first or second filler for resinous composition according to the present invention is preferably contained and used in resinous compositions for use in packaging materials for electronic device. A resinous composition exhibiting a large thermal expansion efficient expands in the facial (or lateral and longitudinal) directions to cause cracks in solder connections, or expands in the thickness direction to cause failure conductions between the layers of printed-circuit boards. Moreover, members having a large difference between their thermal expansion coefficients are likely to generate warpages in semiconductor packages. Lowering the thermal expansion coefficients allows inhibiting these drawbacks from occurring. In addition, the use of the present first or second filler also promises one to produce resinous compositions whose resin containing proportion is high, and which are favorable in adhesion properties and cured or semi-cured machining properties, because the use of the present first or second filler allows achieving a desired thermal expansion coefficient with a lesser filler compounding proportion compared with the sole or individual use of conventional fillers exhibiting a positive thermal expansion coefficient.

Moreover, combining the first or second filler for resinous composition according to the present invention with a solvent dispersing the present first or second filler enables the present first or second filler to be used as a filler-containing slurry composition; or combining the present first or second filler with a resinous material dispersing the present first or second filler enables the present first or second filler to be used as a filler-containing resinous composition.

In addition, a production process for filler for resinous composition according to the present invention achieving the aforementioned object comprises the steps of:

producing a silicone-covered particulate material by covering a surface of a raw-material particulate material, which comprises a crystalline siliceous material with a crystal structure made of at least one member selected from the group consisting of type FAU, type FER, type LTA, type MFI and type CHA, and/or type MWW, with a silicone material; and producing a filler ingredient by transforming the silicone material into silica by heating the silicone-coated particulate material, wherein:

the raw-material particulate material includes the crystalline siliceous material in an amount falling in a range allowing the filler ingredient to exhibit a negative thermal expansion coefficient.

The first and second fillers for resinous composition according to the present invention constructed as aforementioned exhibit a negative thermal expansion coefficient, and effect an advantage of affecting resins less adversely.

DESCRIPTION OF THE EMBODIMENTS

Figure 1:
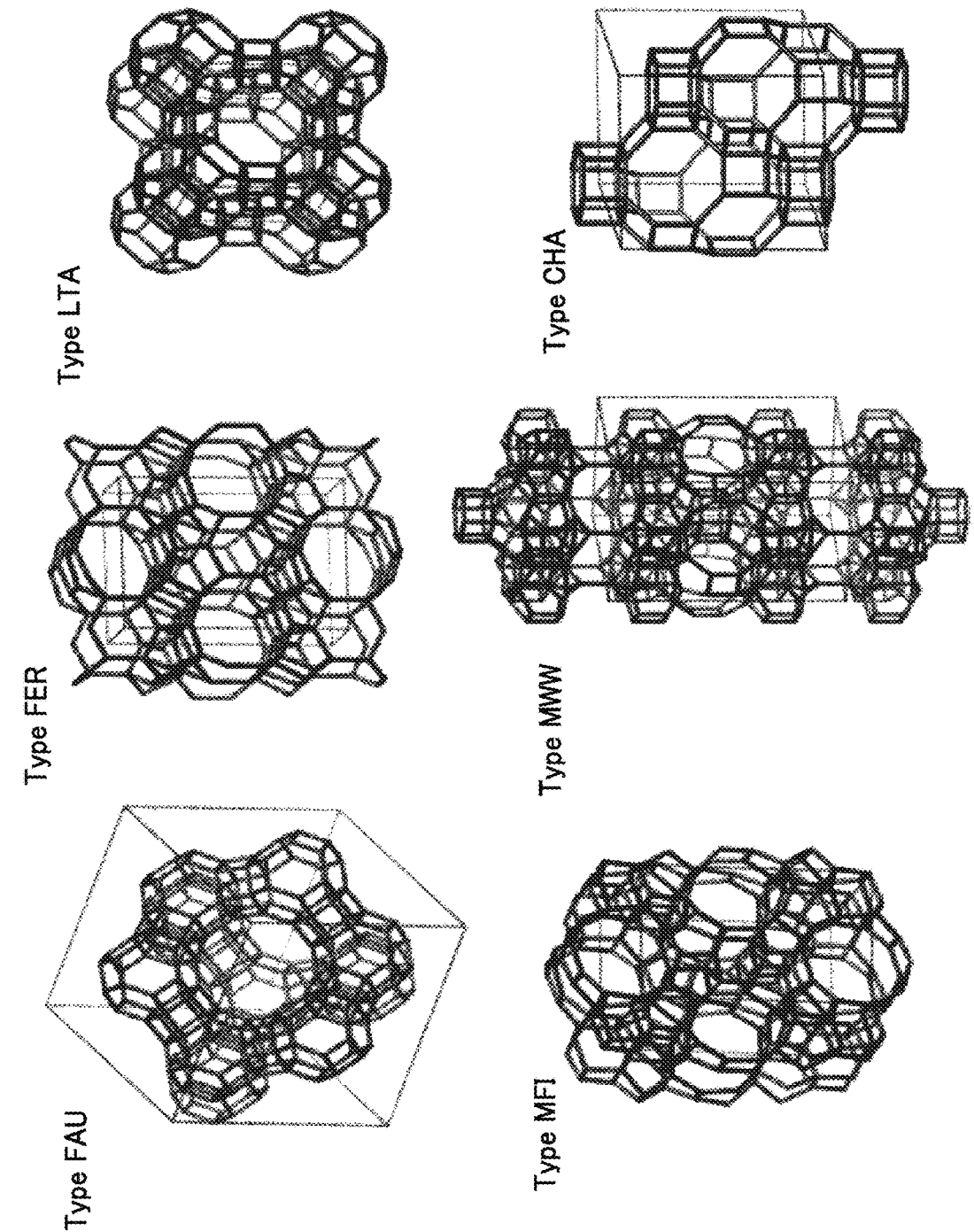
FIG. 1 is a diagram illustrating crystalline backbone structures of crystalline siliceous particulate materials according to the present invention.
Figure 2:
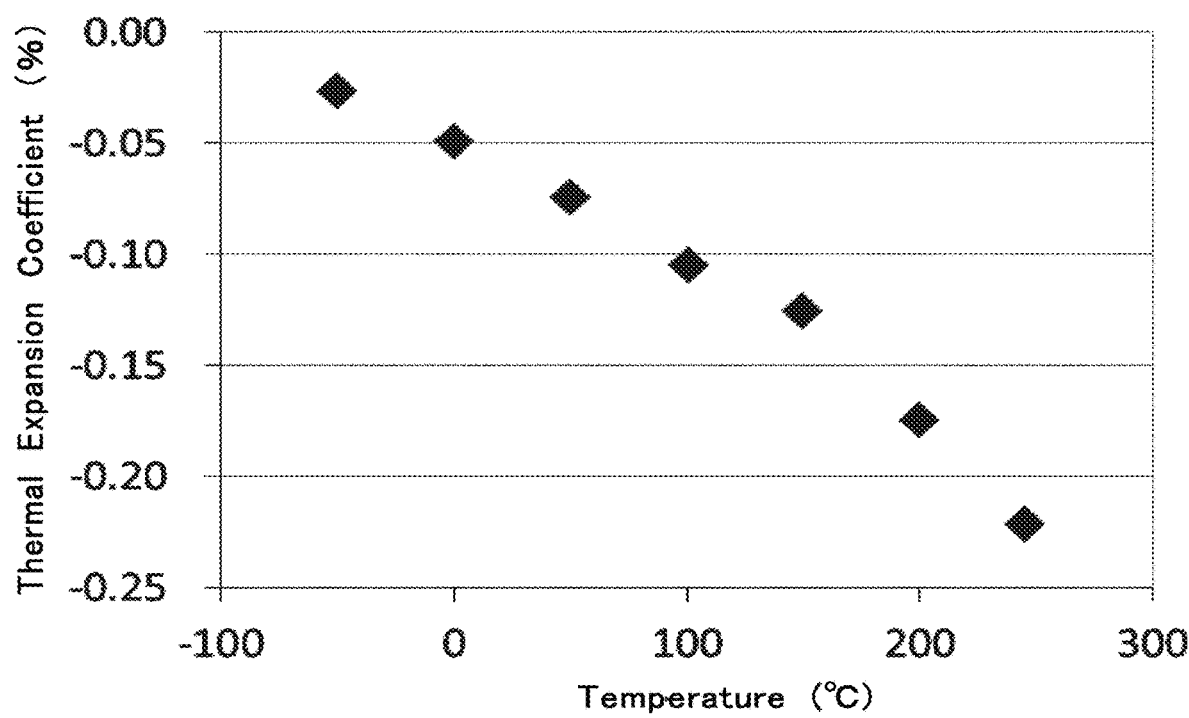
FIG. 2 is a diagram illustrating the results of measuring Siliceous Particle "A" described in the section titled "Examples" for its thermal expansion coefficient.
Figure 3:
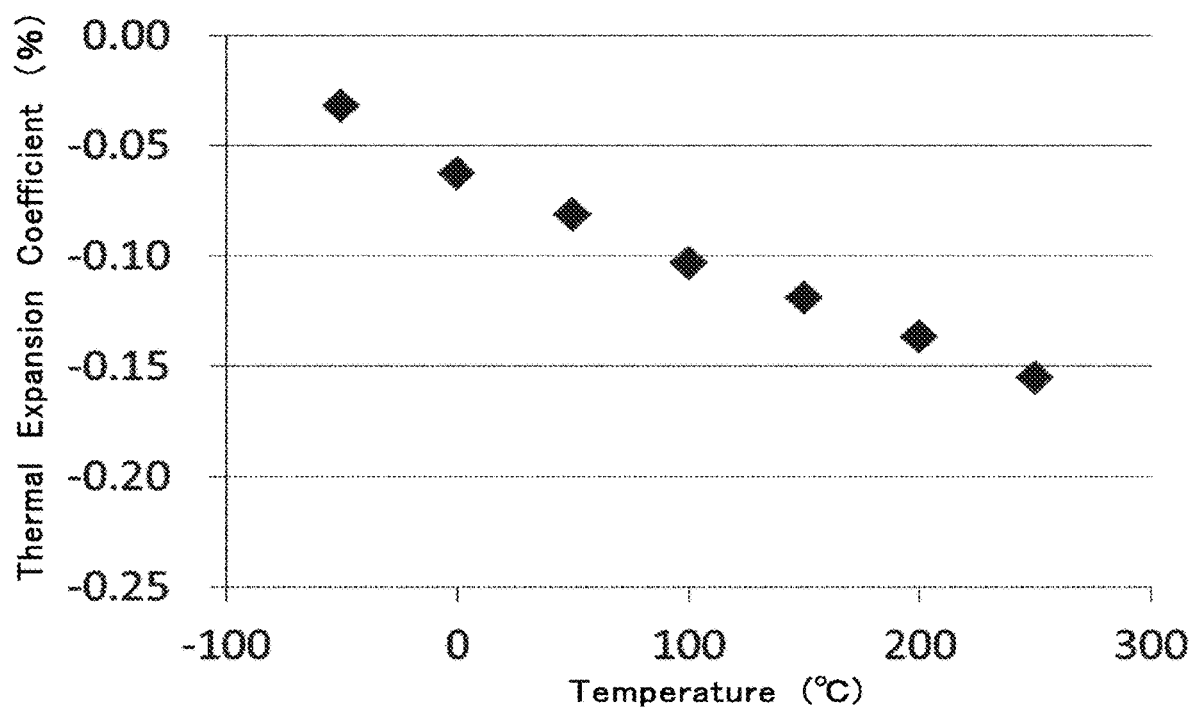
FIG. 3 is a diagram illustrating the results of measuring Siliceous Particle "B" described in the section titled "Examples" for its thermal expansion coefficient.
Figure 4:
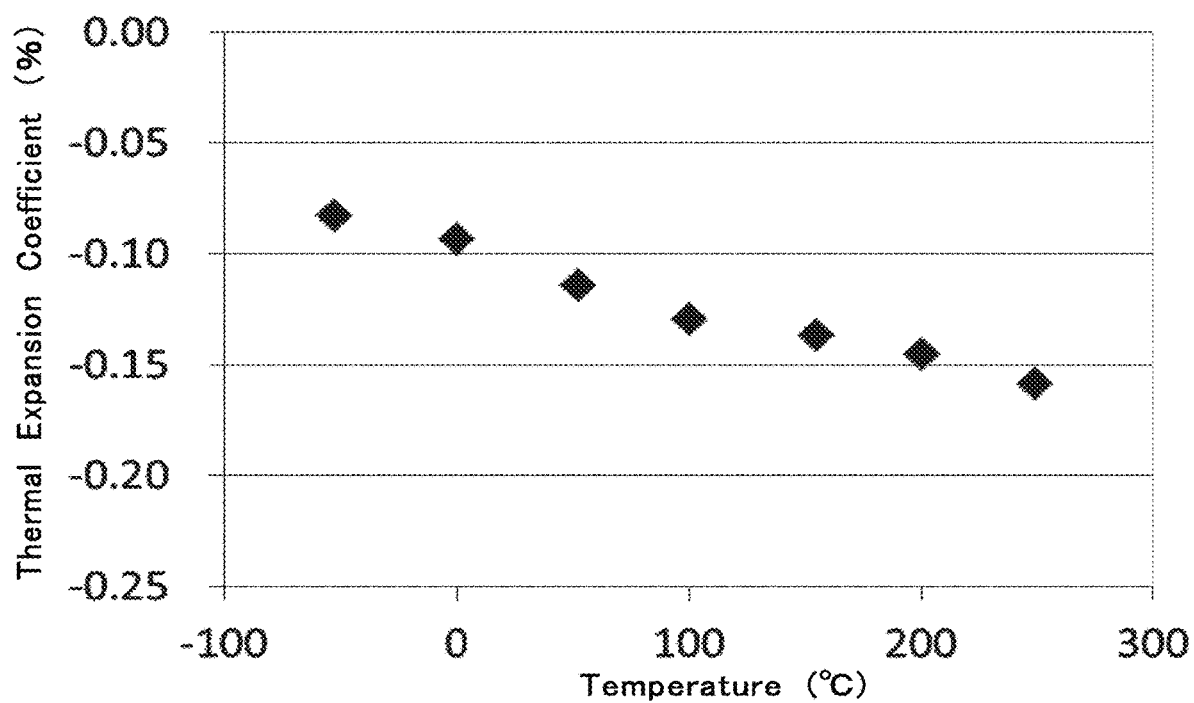
FIG. 4 is a diagram illustrating the results of measuring Siliceous Particle "C" described in the section titled "Examples" for its thermal expansion coefficient.
Figure 5:
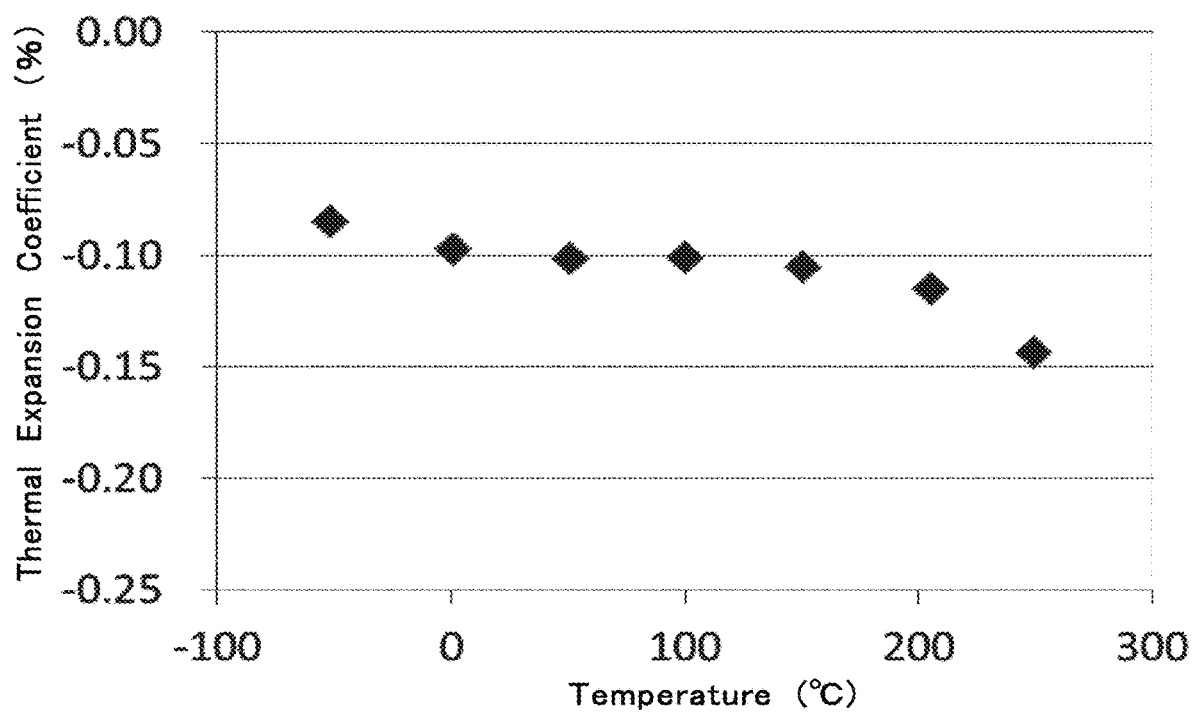
FIG. 5 is a diagram illustrating the results of measuring Siliceous Particle "D" described in the section titled "Examples" for its thermal expansion coefficient.
Figure 6:
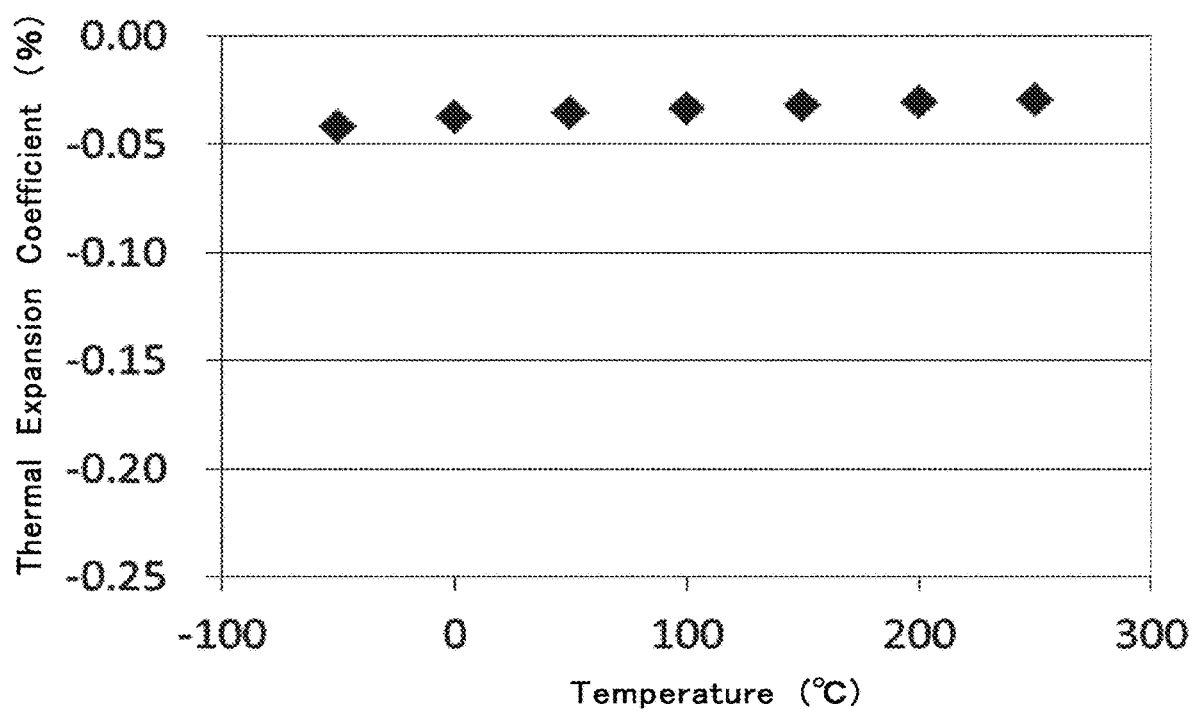
FIG. 6 is a diagram illustrating the results of measuring Siliceous Particle "E" described in the section titled "Examples" for its thermal expansion coefficient.

A filler for resinous composition according to the present invention aims at making its thermal expansion coefficient as small as possible, thereby enabling a resinous composition produced by including the present filler to exhibit a diminished thermal expansion coefficient. Hereinafter, the present filler will be described based on some of its embodiments.

(Filler for Resinous Composition)

A filler for resinous composition according to an embodiment of the present invention is used for the purpose of forming resinous compositions by dispersing it in resinous materials. The present filler exhibits any grain size distribution, which is not at all restricted especially.

However, an exemplifiable grain size distribution preferably has an upper limit value involving 50 μm, 30 μm, 20 μm, 10 μm, five μm, three μm, or one μm. In particular, the present filler is preferably free of particles (or coarse particles) having a particle diameter that is larger than one of the upper limit values.

Although the resinous material to be combined with the filler for resinous composition according to the present embodiment is not limited especially, an exemplifiable resinous material involves thermosetting resins (including those prior to curing), such as epoxy resins or phenol resins, and thermoplastic resins, such as polyesters, acrylic resins or polyolefins. Moreover, in addition to the present filler, the resinous composition also satisfactorily contains other fillers. Note that it does not matter whatever forms, such as powdery or particulate bodies or fibrous bodies, the other fillers have. For example, the resinous composition even competently further contains inorganic substances, such as amorphous silica, alumina, aluminum hydroxide, boehmite, aluminum nitride, boron nitride or carbon materials; or organic substances composed of secondary or auxiliary resinous materials (those with fibrous or particulate shapes) for dispersing fillers, other than the aforementioned resinous material serving as a matrix. Note that it is unnecessary to definitely distinguish the auxiliary resinous materials from the resinous materials serving as a matrix, and it is also difficult to make the distinction. The present filler exhibiting a negative thermal expansion coefficient allows produced resinous compositions to exhibit a lessened, zeroed or negative thermal expansion coefficient, even when they contain the additional fillers or auxiliary resinous materials that exhibit a positive thermal expansion coefficient.

Although a proportion of the filler for resinous composition according to the present embodiment, which produced resinous compositions contain, is not limited especially, an increased proportion permits eventually available resinous compositions to exhibit a lessened or diminished thermal expansion coefficient. For example, the present embodiment allows setting the content at from 5% to 85% approximately based on the entire mass of the resinous composition.

A method of dispersing the filler for resinous composition according to the present embodiment in a resinous material is not limited especially. However, the present filler is mixed satisfactorily with a resinous material under dry condition. Alternatively, the present filler is also competently first dispersed in a certain solvent serving as a dispersion medium to turn it into a slurry, and is then mixed with a resinous material.

The filler for resinous composition according to the present embodiment is constructed in at least one of the following modes: (1) being contained and used in a resinous material constituting a packaging material for electronic device; and (2) being free of a surface in which silver, copper, zinc, mercury, tin, lead, bismuth, cadmium, chromium, cobalt and nickel are exposed.

The present filler constructed in above mode (1) and employed as a packaging material for electronic device allows precisely made electronic devices to upgrade in reliability. Moreover, the present filler constructed in above mode (2) inhibits the elements from diffusing and eluting to the outside, because the elements are not exposed in the surface.

Moreover, in addition to being constructed in at least one of above-described modes (1) and (2), the filler for resinous composition according to the present embodiment makes a filler ingredient comprising: a crystalline siliceous material with a crystal structure made of at least one member selected from the group consisting of type FAU, type FER, type LTA, type MFI and type CHA, and/or type MWW, wherein: the filler ingredient is free of exhibiting any activity when evaluated by an "NH3-TPD" method, and includes the crystalline siliceous material in an amount falling in a range allowing the filler ingredient to exhibit a negative thermal expansion coefficient. In particular, the crystalline siliceous material preferably has a type FAU crystal structure. Note that it is not essential that all of the crystalline siliceous material has one of the crystal structures. That is, the crystalline siliceous material with one of the crystal structures satisfactorily accounts for 50% or more, or preferably 80% or more, based on the entire mass. Notice herein that FIG. 1 illustrates crystalline backbone structures expressed with three alphabetical letters. In addition, the crystalline siliceous material includes alkali metals in a content of 0.1% by mass or less; and includes Li, Na and K in an amount five ppm or less respectively, the Li, Na and K extracted in water when the crystalline siliceous material is immersed in water, which is conditioned at 120° C. and under two atm, for 24 hours.

The filler ingredient has such an extent of grain size distribution or particulate configuration that allows the filler ingredient contained in a resinous composition to express needed properties. For example, a produced resinous composition, which is used for semiconductor encapsulant, is preferably free from the filler ingredient whose particle diameter is larger than that of interstices into which the semiconductor encapsulant penetrates. Specifically, the filler ingredient preferably has a particle diameter of from 0.5 µm to 50 µm approximately, and is more preferably virtually free from coarse particles whose particle diameter is 100 µm or more. Moreover, a produced resinous composition, which is used for printed-circuit board, is preferably free from the filler ingredient whose particle diameter is larger than a thickness of insulation layer that the printed-circuit board has. Specifically, the filler ingredient preferably has such a particle diameter as from 0.2 µm to five µm approximately, and is more preferably virtually free from coarse particles whose particle diameter is 10 µm or more. In addition, the filler ingredient preferably has a particulate configuration whose aspect ratio is low, and more preferably has a spherical shape.

Using a crystalline siliceous material with one of the compatible crystal structures as a raw material, and subjecting it to one or more of operations, like pulverization, classification, granulation and mixing, independently or combinedly allow the production of the filler ingredient according to the present embodiment. Moreover, employing proper conditions for the operations, and performing the operations in an appropriate number of times permit the provision of the filler ingredient with necessary grain size distribution or particulate configuration. In addition, an ordinary method (e.g., hydrothermal synthesis method) allows the synthesis of the crystalline siliceous material per se making a raw material for the present filler ingredient.

The crystalline siliceous particulate material preferably has an aluminum element content of 12% or less, more preferably 8% or less, much more preferably 4% or less, based on the entire mass. Note that the crystalline siliceous particulate material is presumed to preferably hold aluminum in it in an amount close to 0%, but many of crystalline siliceous particulate materials contain aluminum inevitably at present.

The filler ingredient according to the present embodiment is capable of comprising a core portion including the crystalline siliceous material, and a shell portion including an amorphous silica material and covering the core portion. The shell portion preferably covers the core portion entirely. The crystalline siliceous material constituting the core portion, and the amorphous silica material constituting the shell portion are preferably composited with each other. A method how to form the core portion and shell portion will be described later.

An abundance ratio between the crystalline siliceous material and the amorphous silica material is not at all restricted especially as long as falling in a range allowing the filler ingredient to exhibit a negative thermal expansion coefficient as a whole. For example, a preferable abundance ratio makes the filler ingredient exhibit a negative thermal expansion coefficient, and makes it exhibit a degree of crystallinity falling in a range of from 0.3 to 0.9 as a whole. A more preferable abundance ratio makes the filler ingredient exhibit a degree of crystallinity falling in a range of from 0.4 to 0.8 as a whole. The higher degree of crystallinity the filler ingredient formed to comprise the core portion and shell portion exhibits, the larger the absolute value of its negative thermal expansion coefficient becomes. Note that the degree of crystallinity being 1.0 is based on a degree of crystallinity (i.e., X-ray intensity) exhibited only by the crystalline siliceous material that the core portion contains.

The filler for resinous composition according to the present embodiment, and the filler ingredient constituting the present filler can undergo a surface treatment with a surface treatment agent. The surface treatment agent is not at all restricted especially, but preferably comprises an organic silicon compound. Reacting the surface treatment agent comprising an organic silicon compound with or adhering it to a surface of the present filler or filler ingredient allows furthermore preventing active sites, which accelerate yellowing, from making contact with resin. In particular, the surface treatment agent preferably comprises a silane compound. Moreover, among silane compounds, using silane coupling agents and silazanes enables the surface treatment agent to firmly unite with a surface of a processing object comprising the present filler or filler ingredient. In addition, employing silane compounds with functional groups whose affinity to resinous materials is high is possible, because they improve affinity between the crystalline siliceous material and mixed resinous materials as well as they are capable of shielding yellowing active sites in the crystalline siliceous material.

Preferable silane compounds with functional groups whose affinity to resinous materials is high involve silane compounds that have at least one member selected from the group consisting of phenyl groups, vinyl groups, epoxy groups, methacryl groups, amino groups, ureido groups, mercapto groups, isocyanate groups, acrylic groups and alkyl groups. Moreover, even among the preferable silane compounds, exemplifiable silazanes involve 1,1,1,3,3,3-hexamethyldisilazane.

Conditions under which treating the processing object with the surface treatment agent are not at all restricted especially. For example, one of the conditions may possibly involve the processing object covered with the surface treatment agent in an area of 50% or more, preferably 60% or more, more preferably 80% or more, based on an imaginary surface area calculated from an average particle diameter obtained on the assumption that the processing object is an ideal sphere. Note that the area covered with the surface treatment agent is a value calculated from a molecular size and processed amount of the surface treatment agent that are assumed to adhere to or react with a surface of the processing object in a single-layered manner. Moreover, too much amount of the surface treatment agent might possibly keep the filler for resinous composition according to the present embodiment from exhibiting a negative thermal expansion coefficient. Accordingly, an upper limit of the amount of the surface treatment agent is set to fall in such a range as the present filler exhibits a negative thermal expansion coefficient.

Whatever method is satisfactorily employed for performing the surface treatment to the processing object. Bringing the surface treatment agent per se into contact with the processing object, or bringing a solution in which the surface treatment agent is solved in a certain solvent into contact with the processing object, enables the surface treatment agent to adhere onto a surface of the processing object. Moreover, an operation, like heating the processing object with the surface treatment agent adhered, also allows accelerating reactions of the adhered surface treatment agent with the processing object.

Production Process for Filler for Resinous Composition

A production process for filler for resinous composition according to the present embodiment is a method suitable for producing, of the above-described present fillers for resinous composition, one provided with a form comprising the core portion and shell portion. The present production process comprises a covering step, and a transforming step.

The covering step is a step of producing a silicone-covered particulate material by covering a raw-material particulate material with a silicone material. The raw-material particulate material comprises a crystalline siliceous material with a crystal structure made of at least one member selected from the group consisting of type FAU, type FER, type LTA, type MFI and Type CHA, and/or type MWW. In particular, the crystal structure is preferably made of type FAU. The particulars detailed for the above-described present fillers for resinous composition are applicable to the raw-material particulate material as they are.

The silicone material is made of a material capable of transforming into silica at the transforming step described later. The silicone material is not at all restricted especially, and whatever silicone materials may be selected as long as they are able to transform into silica.

A preferable to-be-given silicone material involves silicones, and silane compounds. Silicones are siloxane polymers in which siloxane bonds occur one after another. General-purpose silicones have side chains like alkyl groups. Moreover, silicones can have alkoxy groups; or highly reactive functional groups, like an SiH group. An exemplifiable silane compound involves silane coupling agents, and silazanes.

The silicone material can be selected so as to make it cover the raw-material particulate material with ease. For example, selecting a silicone material with high fluidity makes it easy to cover the raw-material particulate material. An exemplifiable silicone material with high fluidity involves, of low-molecular compounds and siloxane polymers, those having a dynamic viscosity of 200 mm$^2$/s or less, preferably, 150 mm$^2$/s or less. Moreover, another to-be-given silicone material involves silicone materials adhering to the raw-material particulate material on the surface by physical actions, such as adsorption and entanglement, upon covering; or silicone materials forming new chemical bonds. An exemplifiable new chemical bond involves reacting SiH groups or alkoxy groups with the raw-material particulate material on the surface.

An amount of the silicone material, which covers the raw-material particulate material at the covering step, can be determined at one's discretion while considering the limit that allows a filler for resinous composition produced eventually to exhibit a negative thermal coefficient. Moreover, it is preferable to use the silicone material in an amount that permits it to cover the raw-material particulate material on the surface without any interstice.

A method of covering the raw-material particulate material on the surface with the silicone material at the covering step is not at all restricted especially. For example, the following may be given: a method of covering by mixing the silicone material with the raw-material particulate material and then applying shearing forces to them by a pulverization operation, or the like; a method of adhering the silicone material, which is dispersed or dissolved in a proper solvent or dispersion medium, onto the raw-material particulate material by bringing the dispersed or dissolved silicone material into contact with the raw-material particulate material on the surface followed by removing the solvent or dispersion medium; or a method of dispersing the raw-material particulate material in a liquid, in which the silicone material is dispersed or dissolved in a proper solvent or dispersion medium, followed by precipitating the silicone material onto the raw-material particulate material on the surface.

The transforming step is a step of transforming the covering silicone material into silica by heating it. The covering silicone material is heated under any heating condition not restricted at all especially as long as the heating condition allows it to transform into silica. For example, an exemplifiable lower limit for the heating involves 600° C. or more, 700° C. or more, or 800° C. or more; whereas an exemplifiable upper limit therefor involves 1,100° C. or less, 1,200° C. or less, or 1,300° C. or less. These upper limits and lower limits are combinable at one's discretion. An exemplifying atmosphere for the heating involves oxidizing atmospheres comprising air or oxygen. The covering silicone material is heated sufficiently for a time period permitting it to transform into silica. The covering silicone material may even be transformed into silica partially. For example, the covering silicone material can be sufficiently transformed into silica in an amount of 80% by mass or more, or preferably 90% by mass or more.

The production process for filler for resinous composition according to the present embodiment may be able to further comprise a crushing step, a classifying step, or a step of removing coarse particles, because a filler ingredient obtainable after the transforming step might agglomerate partially or entirely.

EXAMPLES (1) Evaluation on Crystalline Siliceous Materials

Siliceous Particles "A" through "D" (i.e., crystalline siliceous materials) given in Table 1, and Siliceous Particle "E" (i.e., an amorphous silica material) also given in the table were sintered with a plasma discharge sintering machine to make test specimens by heating them at 800° C. for an hour. Each of the test specimens was measured for its thermal expansion coefficient at temperatures set within a range of from −50° C. to 250° C. with a measuring apparatus (e.g., a thermomechanical analyzer, "TMA-Q400EM," a product of TA Instruments). Table 1 shows average values of the measured thermal expansion coefficients. FIGS. 2 through 6 illustrate how thermal expansion coefficient changed with temperature for Siliceous Particles through "E," respectively.

Moreover, mixtures were prepared by mixing Siliceous Particles "A" through "E" with a linseed oil so that the siliceous particles respectively accounted for 40% by mass in the prepared mixtures. The mixtures were then preserved at 40° C. for 24 hours. Thereafter, the preserved mixtures were confirmed for the extent of discoloration. The mixtures undergone light discoloration were labeled "satisfactory"; those undergone dark discoloration were labeled "poor"; and those undergone little discoloration were labeled "good." The extent of discoloration shows how high a mixed siliceous particle exhibits activity, because the more intense the extent of discoloration is the more the linseed oil is oxidized.

Moreover, measuring each of Siliceous Particles "A" through "D" for its content of alkali metals yielded 0.1% by mass or less. In addition, each of Siliceous Particles "A" through "D" included Li, Na and K in an amount of five ppm or less, respectively. Note that the amounts of Li, K and Na were those for the elements extracted when Siliceous Particulate "A" through "D" were immersed for 24 hours in water that was conditioned at 120° C. and under two atm.

TABLE

| | Crystal Structure | Al Content (% by mass) | Averaged Coefficient of Thermal Expansion (ppm/K) | Discolored Linseed Oil |
|---|---|---|---|---|
| Siliceous Particle "A" | Type FAU | 0.1 | −6.6 | Poor |
| Siliceous Particle "B" | Type FAU | 0.9 | −4.1 | Poor |

TABLE-continued

| | Crystal Structure | Al Content (% by mass) | Averaged Coefficient of Thermal Expansion (ppm/K) | Discolored Linseed Oil |
|---|---|---|---|---|
| Siliceous Particle "C" | Type FAU | 11.7 | −2.5 | Poor |
| Siliceous Particle "D" | Type MFI | 0.1 | −2.0 | Poor |
| Siliceous Particle "E" | Amorphous | 0.01 | 0.4 | Good |

Table 1 revealed that, although Siliceous Particle "E," an amorphous silica material, showed no appreciable discoloration in the linseed oil, all of Siliceous Particles "A" through "D" comprising crystalline siliceous materials, showed appreciable dark discoloration in the linseed oil. Moreover, FIGS. 2 through 6 clearly found that Siliceous Particles "A" through "D" comprising crystalline siliceous materials exhibited negative coefficients of thermal expansion (or CTE); whereas Siliceous Particle an amorphous silica material, exhibited positive coefficients of thermal expansion. Moreover, Siliceous Particles "A" through "C" with type FAU crystal structure were found to have greater absolute values of the negative coefficients of thermal expansion than those of Siliceous Particles "D" with type MFI crystal structure. In addition, it was found that, in Siliceous Particles "A" through "C" with the identical type FAU crystal structure, the less the Al content was, the greater the absolute value of the negative coefficients of thermal expansion became.

At the covering step, silicone-covered particulate materials, in which each of Silicone Materials "A" through "D" covered the Siliceous Particle "A" on the surface, were prepared by mixing Siliceous Particle "A" and each of the silicone materials with each other in mass ratios given in Table 2. Subsequently, at the transforming step, the resulting silicone-covered particulate materials were transformed into amorphous silica materials by heating them at 1,050° C. for an hour, thereby producing composite particles (i.e., one of claimed filler ingredients) in which Siliceous Particle "A" made a core portion and the respective amorphous silica materials made a shell portion. Note that measuring Silicone Materials "A" through "D" used herein for their dynamic viscosity at 25° C. yielded: 25 mm$^2$/s for Silicone Material "A"; 110 mm$^2$/s for Silicone Material "B"; 100 mm$^2$/s for Silicone Material "C"; and 7 mm$^2$/s for Silicone Material "D." Moreover, Siliceous Particle "E" was also evaluated for its characteristics as described below after being heated as it was at 1,050° C. for an hour.

TABLE 2

| Test Ex. No. | | 1 | 2 | 3 | 4 | 5 | 6 | 7 |
|---|---|---|---|---|---|---|---|---|
| Make up of Composite Particle | Siliceous Particle "A" | 100 | 100 | 100 | 100 | 100 | 100 | |
| | Siliceous Particle "E" | | | | | | | 100 |
| | Silicone Material "A" | 20 | 30 | 40 | | | | |
| | Silicone Material "B" | | | | 20 | | | |
| | Silicone Material "C" | | | | | 40 | | |
| | Silicone Material "D" | | | | | | 60 | |
| Evaluation on Composite Particle | Calcination Temperature (° C.) | 1,050 | 1,050 | 1,050 | 1,050 | 1,050 | 1,050 | 1,050 |
| | Degree of Crystallization | 0.86 | 0.76 | 0.61 | 0.77 | 0.30 | 0.41 | 0.00 |
| | Discolored Linseed Oil | Satisfactory | Good | Good | Good | Good | Good | Good |
| | Resinous Composition's Coefficient of Thermal Expansion (ppm/K) | 37.7 | 40.8 | 41.6 | Not Applicable | 47.0 | Not Applicable | 52.4 |

The thus produced composite particles according to Test Example Nos. 1 through 7 were evaluated for the following characteristics.

(2) Measurement of Degree of Crystallization

Evaluating the respective composite particles according to Test Example Nos. 1 through 7 for their X-ray diffraction observed a peak of crystal in Siliceous Particle "A" that overlapped with a halo of the amorphous silica materials that existed in the composite particles on the surface. Evaluating Test Example No. 7 for X-ray diffraction observed only a halo derived from an amorphous silica material, Siliceous Material "E." Moreover, Table 2 shows the degree of crystallization of Test Example Nos. 1 through computed as a relative value to the degree of crystallization of independent Siliceous Particulate "A" that was taken as one.

(3) Evaluation on Discolored Linseed Oil

The above-described method was used to evaluate the composite particles according to Test Example Nos. 1 through 7 for their discolored linseed oil. Table 2 shows the results.

Table 2 reveals that covering Siliceous Particle "A" (i.e., acrystalline siliceous material) on the surface with amorphous silica materials made from Silicones "A" through "D" allows inhibiting the produced composite particles from discoloring, because the composite particles according to Test Example Nos. 2 through 7 hardly showed appreciable discoloration. Although the composite particle according to Test Example No. 1 showed slightly appreciable discoloration, it showed greatly recognizable improvements over Siliceous Particle "A," the raw material itself. It is possible to believe that the composite particle according to Test Example No. 1 did not completely inhibit Siliceous Particle "A" from showing the catalytic activity, because it exhibited a high degree of crystallization so that it comprised an amorphous silica material in a lower proportion than did the other composite particles according to Test Example Nos. 2 through 7.

(4) Evaluation on Coefficient of Thermal Expansion 35 parts by mass of each of the composite particles according to Test Example Nos. 1 through 3 and 5; and Siliceous Particle "E" according to Test Example No. 7 were mixed with 65 parts of a resinous material, and was thereafter cured to prepare resinous compositions (or cured substances) serving as test samples. Note that the resinous material comprised a mixture of a liquid epoxy resin including bisphenol-A and bisphenol-F in which the ratio of the former to the latter was 50:50 by mole, and an amine-based curing agent. The prepared test samples were evaluated for their thermal expansion coefficient (e.g., an average value of their thermal expansion coefficients over a temperature range of from 0° C. to 50° C.). Table 2 gives the results. Note that a cured substance made independently of the resinous material exhibited a thermal expansion coefficient of 70.0 ppm/K.

Figure 7:
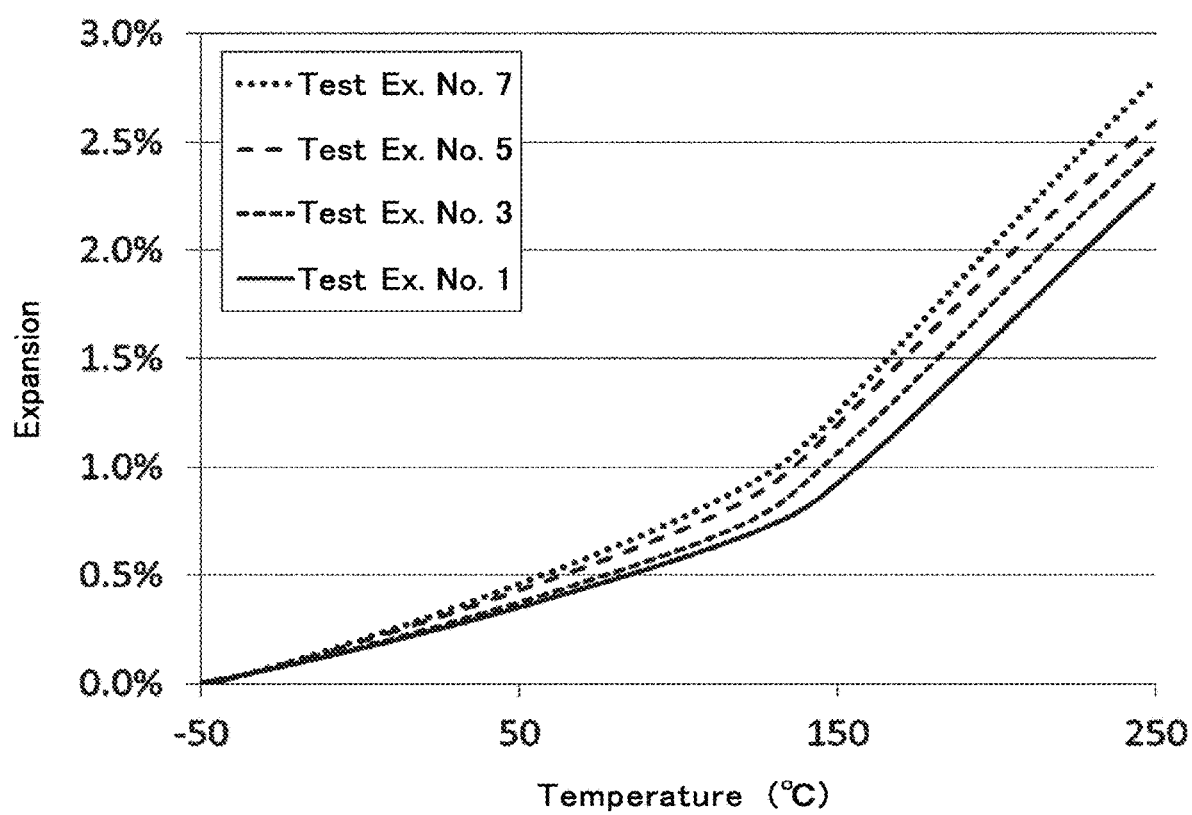
FIG. 7 is a diagram illustrating the results of measuring resinous compositions, in which fillers for resinous composition according to Test Example Nos. 1, 3, 5 and 7 described in the section titled "Examples," were mixed, for their thermal expansion.

Table 2 reveals that the resinous compositions according to Test Example Nos. 1 through 3 and 5 comprising Siliceous Particle "A" (i.e., a crystalline siliceous material) exhibited a lower coefficient of thermal expansion (or CTE) than did the resinous composition according to Example No. 7 comprising Siliceous Particle "E" (i.e., an amorphous silica material) alone. Moreover, all of the calculations of the thermal expansion coefficients of the composite particles according to Test Example Nos. 1, 2, 3 and 5 from the thermal expansion coefficient of the independent resinous material yielded negative-value coefficients of thermal expansion. FIG. 7 illustrates how the temperature change fluctuated the thermal expansion coefficients of Test Example Nos. 1, 3, 5 and 7.

(5) Evaluation on Activity by "NH3-TPD" Method

Figure 8:
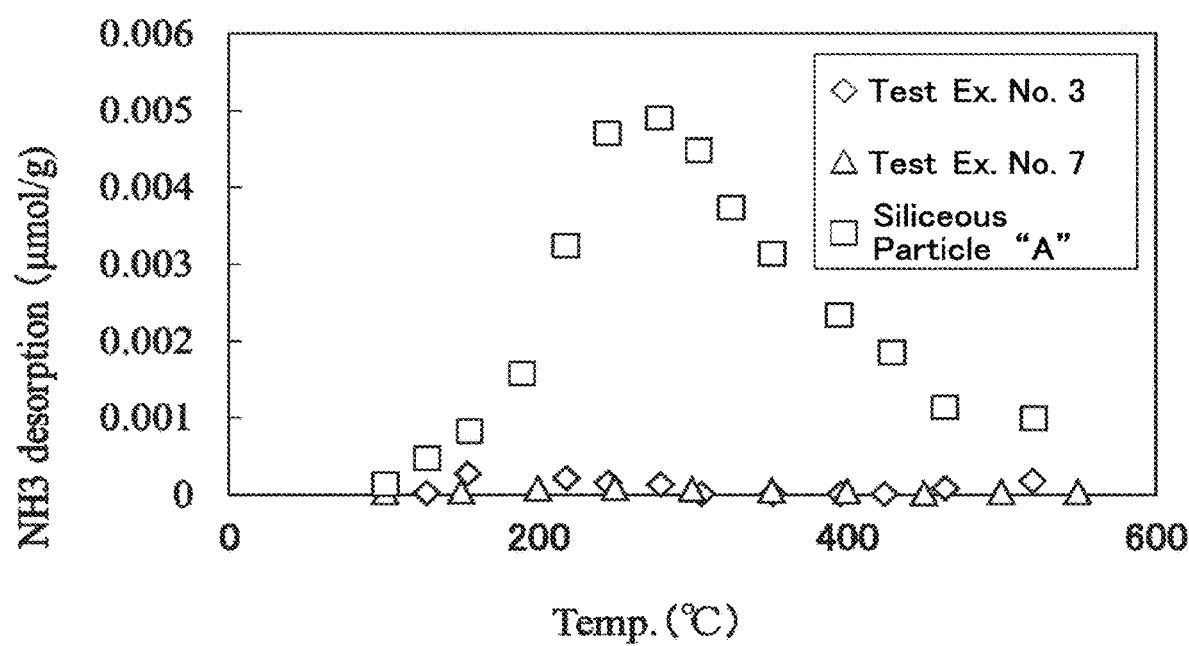
FIG. 8 is a diagram illustrating the results of measuring Test Example Nos. 3 and 7 as well as Siliceous Particle "A" described in the section titled "Examples" for their activity by an "NH3-TPD" method.

The composite particle according to Test Example No. 3, Siliceous Particle "E" according to Test Example No. 7, and Siliceous Particle "A" were evaluated for their activity by an ammonia temperature-increment desorption method (or "NH3-TPD" method) which has been widely used to evaluate powdery catalysts for their activity. The "NH3-TPD" method comprised the steps of pretreating a powdery specimen by adsorbing ammonia onto it at 100° C. for an hour; and measuring an amount of desorbing ammonia gas after raising the temperature of the powdery specimen up to 600° C. continuously. FIG. 8 illustrates the results.

Ammonia gas desorbing at from 200° C. to 300° C. was detected in Siliceous Particle "A"; whereas no desorption of ammonia gas was observed in Test Example Nos. 3 and 7. Specifically, Siliceous Particle "A" exhibited a desorption peak temperature at 271° C., and had detected ammonia gas in a desorption amount of 5.5 µmol/g; whereas Test Example Nos. 3 and 7 exhibited no desorption peak temperature, and had detected ammonia gas in a desorption amount of less than 0.6 µmol/g.

That is, the observation by the "NH3-TPD" method found that, while Siliceous Particle "A" comprising a crystalline siliceous material with type FAU crystal structure exhibited the high activity derived from the crystalline siliceous material, the composite particle according to Test Example No. 3 comprising Siliceous Particle "A" covered with an amorphous silica material on the surface was able to completely inhibit the crystalline siliceous material with type FAU crystal structure, which existed in the core portion, from showing the activity. Moreover, Test Example No. 7 comprising Siliceous Particle "E," an independent amorphous silica material, did not show any appreciable activity, either.

(6) Evaluation on Relative Permittivity

The test samples according to Test Example Nos. 3 and 7 used for the measurement of their thermal expansion coefficient were measured for their relative permittivity at one GHz by a perturbation technique with a network analyzer. Repeating the measurements three times, and averaging the obtained three measured relative permittivities for the respective test samples resulted in giving 3.0 for Test Example No. 3; 3.3 for Test Example No. 7; and 3.2 for the independent resinous material. Thus, making the core portion of Siliceous Particle "A," a crystalline siliceous material, allowed the produced resinous composition to exhibit a lower relative permittivity than that of the other produced resinous composition comprising Siliceous Particle "E," an amorphous silica material.

INDUSTRIAL APPLICABILITY

The fillers for resinous composition according to the present invention exhibit a negative thermal expansion coefficient. Accordingly, the present fillers mixed with resinous materials exhibiting a positive thermal expansion coefficient allow the cancelation or reduction of the positive thermal expansion coefficient. Consequently, the present fillers permit manufacturers to produce resinous compositions whose thermal expansion coefficient is small, and which are of good thermal characteristic.

What is claimed is:

1. A filler having an aluminum element content of 12% or less based on an entire mass thereof, comprising:
 a filler ingredient having a core portion including a crystalline siliceous material and a shell portion including an amorphous silica material and covering the core portion without an interstice, such that the crystalline siliceous material and the amorphous silica material are composited with each other,
 wherein the crystalline siliceous material in the core portion has a crystal structure made of at least one member selected from the group consisting of type FAU, type FER, type LTA, type MFI, type CHA, and type MWW, and includes an alkali metal in a content of 0.1% by mass or less,
 the filler ingredient does not have any activity when evaluated by an NH3-TPD methods,
 the filler ingredient includes the crystalline siliceous material in an amount falling in a range allowing the filler ingredient to exhibit a negative thermal expansion coefficient, when the crystalline siliceous material is immersed in water conditioned at 120° C. and under two atm for 24 hours, an amount of each of Li, Na and K extracted in the water is five ppm or less, and the filler is suitably contained and used in a resinous composition constituting electronic packaging material for electronic device.

2. A filler having an aluminum element content of 12% or less based on an entire mass thereof, comprising:

a filler ingredient having a core portion including a crystalline siliceous material and a shell portion including an amorphous silica material and covering the core portion without an interstice, such that the crystalline siliceous material and the amorphous silica material are composited with each other, wherein the crystalline siliceous material in the core portion has a crystal structure made of at least one member selected from the group consisting of type FAU, type FER, type LTA, type MFI, type CHA, and type MWW, and includes an alkali metal in a content of 0.1% by mass or less, the filler ingredient is free of a surface in which silver, copper, zinc, mercury, tin, lead, bismuth, cadmium, chromium, cobalt and nickel are exposed, the filler ingredient does not have any activity when evaluated by an NH3-TPD methods, the filler ingredient includes the crystalline siliceous material in an amount falling in a range allowing the filler ingredient to exhibit a negative thermal expansion coefficient, when the crystalline siliceous material is immersed in water conditioned at 120° C. and under two atm for 24 hours, an amount of each of Li, Na and K extracted in the water is five ppm or less, and the filler is suitably contained and used in a resinous composition.

3. The filler according to claim 1, further comprising:
a surface treatment agent including an organic silicon compound reacted with or adhered to a surface of the filler ingredient.

4. The filler according to claim 3, wherein the organic silicon compound includes at least one member selected from the group consisting of silazane and silane coupling agents.

5. The filler according to claim 1, wherein the crystal structure is type FAU.

6. A filler-containing slurry resinous composition comprising:
the filler according to claim 1; and
a solvent dispersing the filler.

7. A filler-containing resinous composition comprising:
the filler according to claim 1; and
a resinous material dispersing the filler.

8. A process for producing a filler having an aluminum element content of 12% or less based on an entire mass thereof for resinous composition, the process comprising:

producing a silicone-covered particulate material by covering a surface of a raw-material particulate material with a silicone material, where the raw-material particulate material comprises a crystalline siliceous material with a crystal structure made of at least one member selected from the group consisting of type FAU, type FER, type LTA, type MFI, type CHA, and type MWW; and heating the silicone-coated particulate material, thereby transforming the silicone material into silica and producing a filler ingredient having a core portion including the crystalline siliceous material and a shell portion including an amorphous silica material and covering the core portion without an interstice, such that the crystalline siliceous material and the amorphous silica material are composited with each other, wherein:

the raw-material particulate material includes the crystalline siliceous material in an amount falling in a range allowing the filler ingredient to exhibit a negative thermal expansion coefficient;

the crystalline siliceous material includes an alkali metal in a content of 0.1% by mass or less;

when the crystalline siliceous material is immersed in water conditioned at 120° C. and under two atm for 24 hours, an amount of each of Li, Na and K extracted in the water is five ppm or less;

the filler ingredient does not have any activity when evaluated by an NH3-TPD methods, and the filler ingredient is free of a surface in which silver, copper, zinc, mercury, tin, lead, bismuth, cadmium, chromium, cobalt and nickel are exposed.

9. The filler according to claim 2, further comprising:
a surface treatment agent including an organic silicon compound reacted with or adhered to a surface of the filler ingredient.

10. The filler according to claim 9, wherein the organic silicon compound includes at least one member selected from the group consisting of silazane and silane coupling agents.

11. The filler according to claim 2, wherein the crystal structure is type FAU.

12. A filler-containing slurry resinous composition comprising:
the filler according to claim 2; and
a solvent dispersing the filler.

13. A filler-containing resinous composition comprising:
the filler according to claim 2; and
a resinous material dispersing the filler.

14. An encapsulant for an electronic device, comprising:
the filler according to claim 1; and
a resinous material.

15. An encapsulant for an electronic device, comprising:
the filler according to claim 2; and
a resinous material.

* * * * *